United States Patent [19]

Matsumoto et al.

[11] Patent Number: 4,891,559

[45] Date of Patent: Jan. 2, 1990

[54] APPARATUS FOR CONTROLLING A HEADLIGHT OF A VEHICLE

[75] Inventors: Muneaki Matsumoto, Okazaki; Koji Numata, Toyokawa; Shigeyuki Akita; Minoru Nishida, both of Okazaki; Mitsuhiko Masegi, Aichi, all of Japan

[73] Assignees: Nippondenso Soken, Inc., Nishio; Nippondenso Co., Ltd., Kariya, both of Japan

[21] Appl. No.: 139,111

[22] Filed: Dec. 28, 1987

Related U.S. Application Data

[63] Continuation of Ser. No. 874,155, Jun. 13, 1986, abandoned.

[30] Foreign Application Priority Data

Jun. 13, 1985 [JP] Japan .................. 60-129000
Jun. 13, 1985 [JP] Japan .................. 60-129001
Jun. 13, 1985 [JP] Japan .................. 60-129002

[51] Int. Cl.$^4$ .................. G08B 21/00; B60Q 1/26; B60Q 1/10
[52] U.S. Cl. .................. 315/82; 315/79; 315/83; 362/64; 362/65; 362/66; 362/71; 250/211 R
[58] Field of Search .................. 315/80, 81, 82, 83, 315/79; 362/63, 64, 65, 66, 71; 250/211 R

[56] References Cited

U.S. PATENT DOCUMENTS

| 3,617,795 | 11/1971 | Peek | 315/82 |
|---|---|---|---|
| 4,197,491 | 4/1980 | Connell et al. | 315/82 |
| 4,558,259 | 12/1985 | Craig | 315/82 |
| 4,559,544 | 7/1986 | Martin | 315/83 |
| 4,564,789 | 1/1986 | Kokubu | 315/79 |
| 4,583,152 | 4/1987 | Kawai et al. | 362/71 |
| 4,599,544 | 7/1986 | Martin | 315/83 |
| 4,675,535 | 6/1987 | Tsunekawa et al. | 250/211 |
| 4,728,861 | 3/1988 | Kurihara et al. | 315/82 |

Primary Examiner—Donald J. Yusko
Assistant Examiner—Brian Palladino
Attorney, Agent, or Firm—Cushman, Darby & Cushman

[57] ABSTRACT

In an apparatus for controlling a headlight of a vehicle, a light from a preceding or oncoming vehicle can be detected without being disturbed by a light reflected on guardrails and the like, or light from a traffic signal, street lights and the like, and the illumination area of the headlight can be suitably adjusted without unnecessary switching of an illumination mode of the headlight. This control is carried out by receiving a light impinging on the front end of the vehicle by a light receiving member divided into a plurality of regions, by carrying out a comparison and discrimination between the light detection signals from the plurality of regions, and based on a result thereof, by selecting an appropriate illumination mode of the headlight.

9 Claims, 16 Drawing Sheets

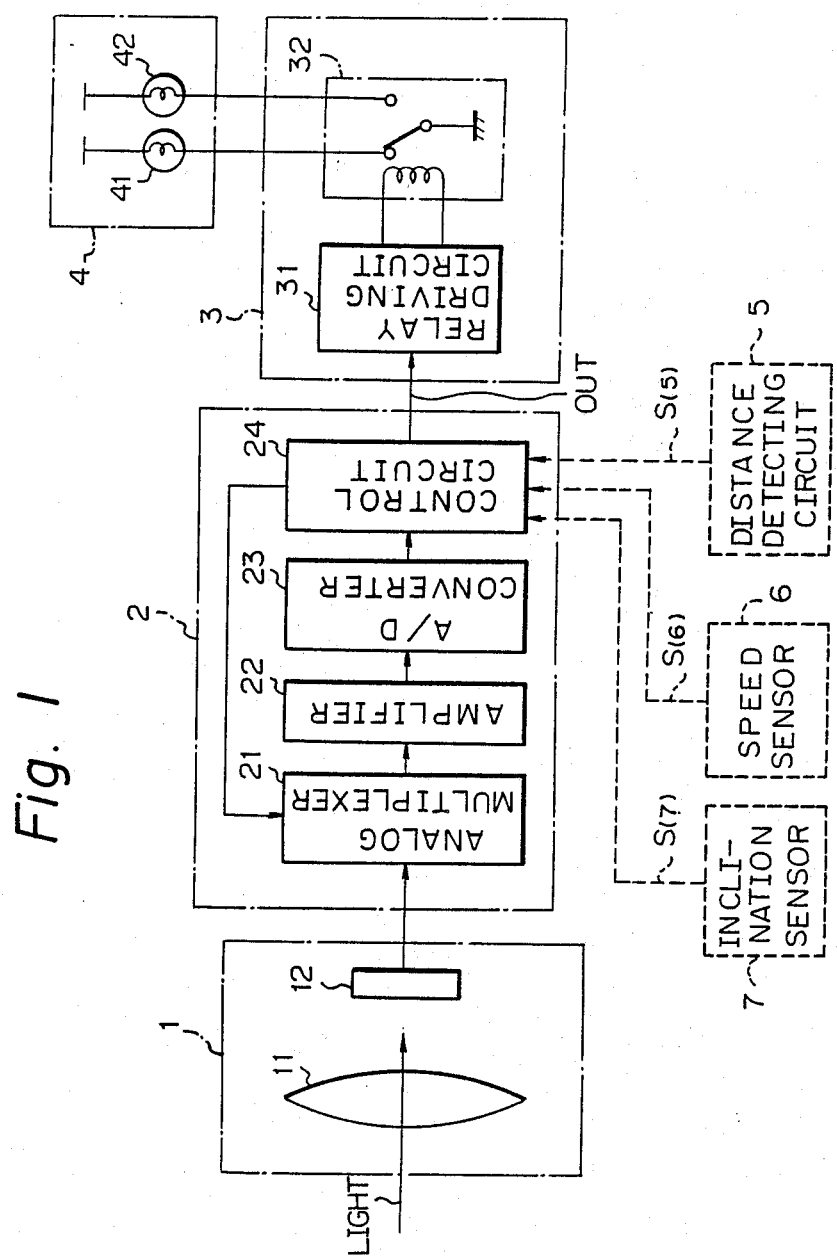

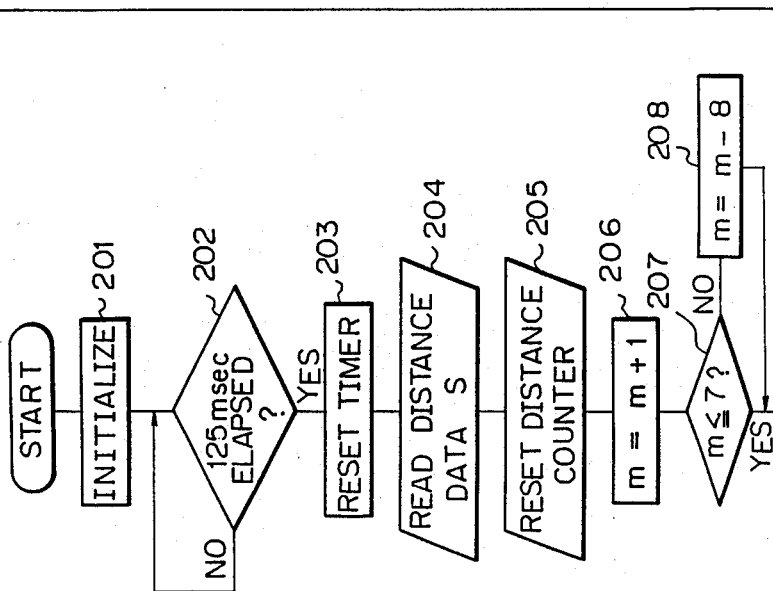
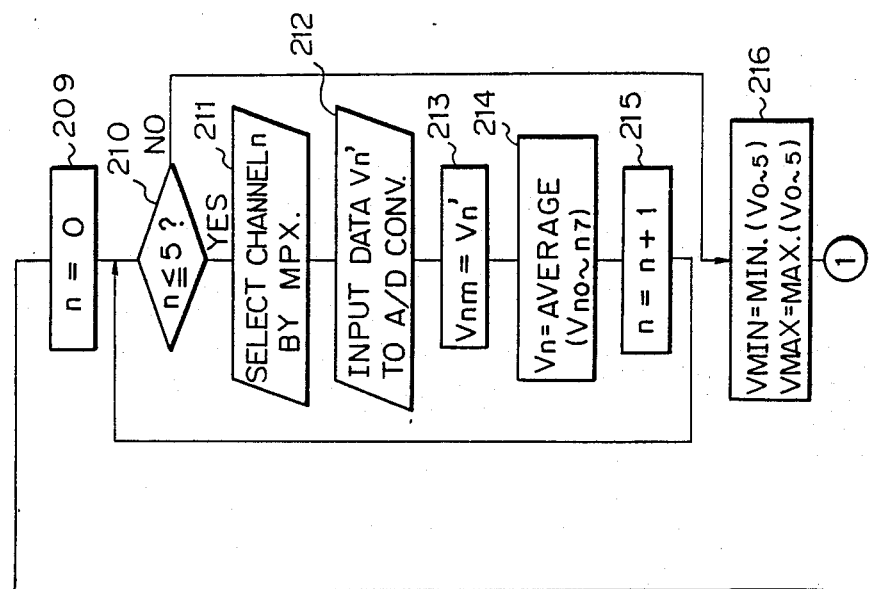
Fig. 2A

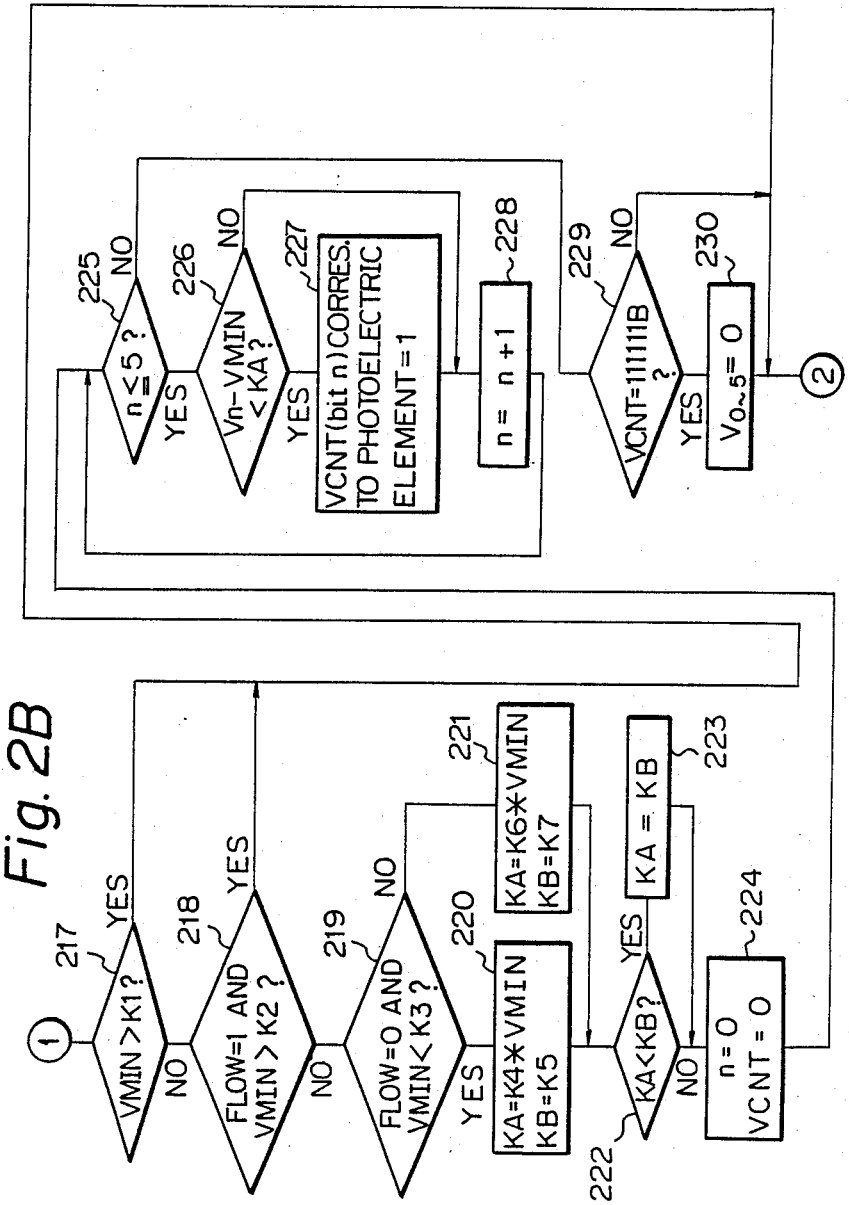

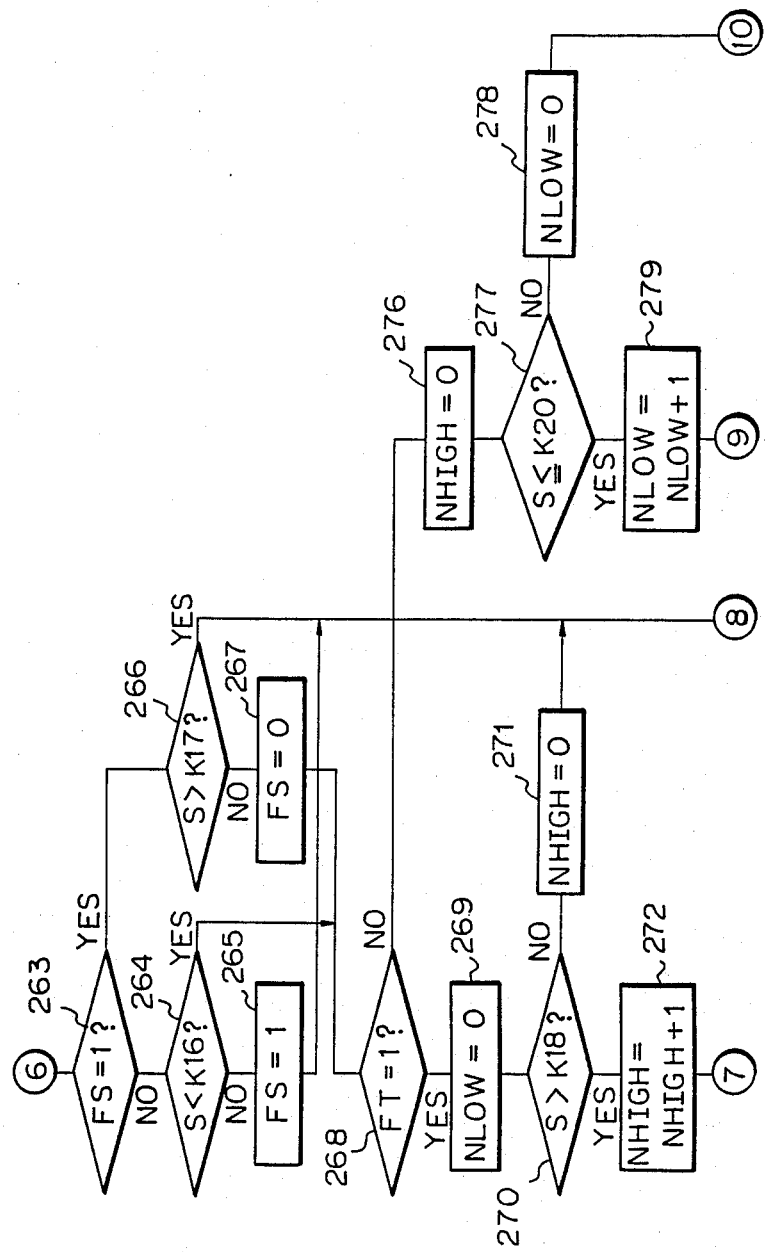

Fig. 10
(1) INCLINATION ANGLE IS WITHIN PREDETERMINED ANGLE (i = 2 SELECTED)
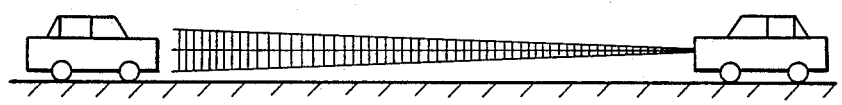
(2) INCLINATION ANGLE IS ABOVE PREDETERMINED ANGLE (i = 1 SELECTED)
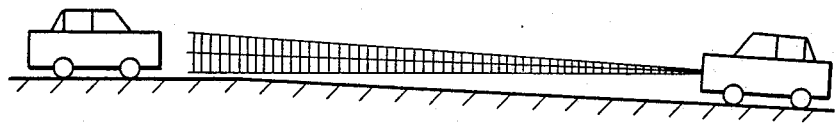
(3) INCLINATION ANGLE IS BELOW PREDETERMINED ANGLE (i = 3 SELECTED)
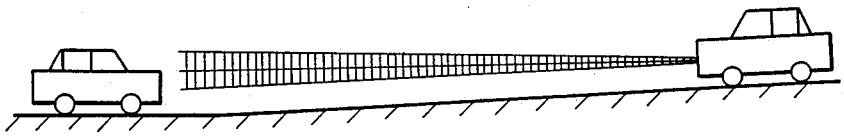

Fig. 11
(1) SPEED IS BELOW PREDETERMINED SPEED
 (j = 3~8 SELECTED)
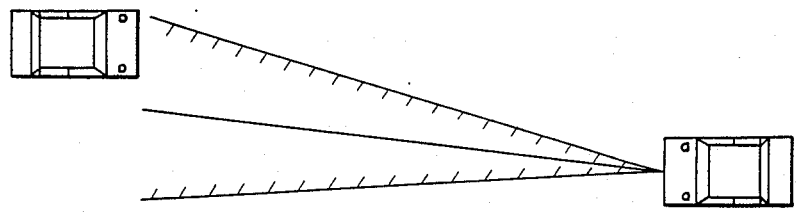
(2) SPEED IS ABOVE PREDETERMINED SPEED
 (j = 1~10 SELECTED)
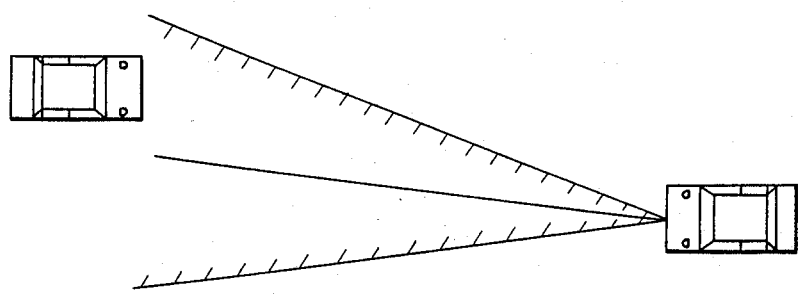

APPARATUS FOR CONTROLLING A HEADLIGHT OF A VEHICLE

This is a continuation of Ser. No. 874,155, filed June 13, 1986 now abandoned.

BACKGROUND OF THE INVENTION

1. Field of the Invention

The present invention relates to an apparatus for controlling a headlight of a vehicle and, in particular, to an apparatus for automatically selecting the illumination mode of the headlight of a vehicle, for example between high beam mode and low beam mode, according to the amount of light impinging on the front end of the vehicle.

2. Description of the Related Art

An example of such an apparatus for controlling the headlight of a vehicle, is known in which a light detecting device, e.g., a photo sensor, receives light impinging on the front of the vehicle and generates a light detection signal corresponding to the quantity of light received. Based on the light detection signal from the photo sensor, the presence or absence of a preceding vehicle or an oncoming vehicle, or an illumination mode of the headlight of the vehicle is determined, so that an area illuminated by the headlight of the vehicle can be adjusted. This kind of apparatus possesses an advantage in that the light beams from the headlight of the vehicle do not subject the preceding vehicle or oncoming vehicle to glare from the vehicle headlights. On the other hand, the range of angle of the incident light, hereinafter referred to as the directional angle range, in the photo sensor including a lens must be exactly set. For example, the taillight beams of a preceding vehicle or the headlight beams of an oncoming vehicle at night may be erroneously detected. In the above related art apparatus, the area illuminated by the headlight of the vehicle is adjusted according to the total quantity of light incident on the photo sensor, and the directional angle range of a plurality of photoelectric elements constituting the photo sensor is fixed.

That is, the related art apparatus is not constituted so that the area illuminated by the headlight of the vehicle can be adjusted according to the respective quantity of light incident on the respective photoelectric element of the photo sensor. Accordingly, for example, when the light beams from the headlight of the self vehicle are reflected on the road plane in front of the vehicle, light is reflected by guardrails, buildings and the like, and received by the photo sensor. This causes a problem in that the switching between the high beam mode and the low beam mode is made without discrimination between such reflected light and the light from a preceding or oncoming vehicle, so that an unnecessary switching frequently occurs. Also, since the directional angle range of the photo sensor is fixed, the photosensor cannot properly adapt to situations where a preceding or oncoming vehicle is for example, a bus, a large-sized truck and the like having taillights in a high position, or to undesired light from street lights, traffic signals and the like, as well as the light from a preceding vehicle. Thus a discrimination between light which should be detected and light which should not be detected cannot be accurately made. Furthermore, because the directional angle range of the photo sensor is fixed, there is a possibility that the preceding or oncoming vehicle to be detected will be outside the directional angle range in a wide road, for example, a two lanes, one-way road, a sloping road, and the like. Assuming that the directional angle range of the photo sensor is increased to cope with this possibility, a problem occurs in that the photo sensor becomes unnecessarily sensitive to the undesired light from street lights, traffic signals, and the like.

SUMMARY OF THE INVENTION

It is an object of the present invention to provide an improved apparatus for controlling a headlight of a vehicle in which the area illuminated by the headlight is suitably controlled.

It is another object of the present invention to detect light from a preceding or oncoming vehicle without being disturbed by a light reflected from guardrails and the like or light from street lights, traffic signals and the like, and accordingly, suitably adjust the area illuminated by the headlight to eliminate all unnecessary switching of an illumination of the headlight of the vehicle.

Therefore, according to the present invention, there is provided an apparatus for controlling a headlight of a vehicle comprising; a light detecting unit for receiving a light impinging on the front of the vehicle by a light receiving member divided into a plurality of regions in a predetermined direction and generating a light detection signal corresponding to the quantity of the light received by each of the regions of the light receiving member; a control unit for receiving the light detection signal from the light detecting unit, carrying out a comparison and discrimination between the light detection signals from the plurality of regions of the light receiving member, selecting an illumination mode of the headlight of the vehicle based on a result of the comparison and discrimination, and generating a control signal for attaining the selected illumination mode of the headlight; and an illumination switching unit for receiving the control signal from the control unit and switching the illumination of the headlight to attain the selected illumination mode.

The present invention will be described hereinafter in detail by way of examples with reference to the accompanying drawings.

BRIEF DESCRIPTION OF THE DRAWINGS

FIG. 1 shows a schematic diagram of the apparatus for controlling the headlight of a vehicle according to the present invention;

FIGS. 2A-2F are flow charts of the operation of the control circuit according to an embodiment of the present invention;

FIG. 10 shows the upper and lower change of the directional angle range of the photo sensor in the embodiment of FIGS. 9A and 9B;

FIG. 11 shows the left and right change of the directional angle range of the photo sensor in the embodiment of FIGS. 9A-9B; and, FIG. 12 shows an example of the arrangement of photoelectric elements of the photo sensor in the embodiment of FIGS. 9A-9B.

DESCRIPTION OF THE PREFERRED EMBODIMENTS

Fundamental Arrangement and Operation

Figure 2C:
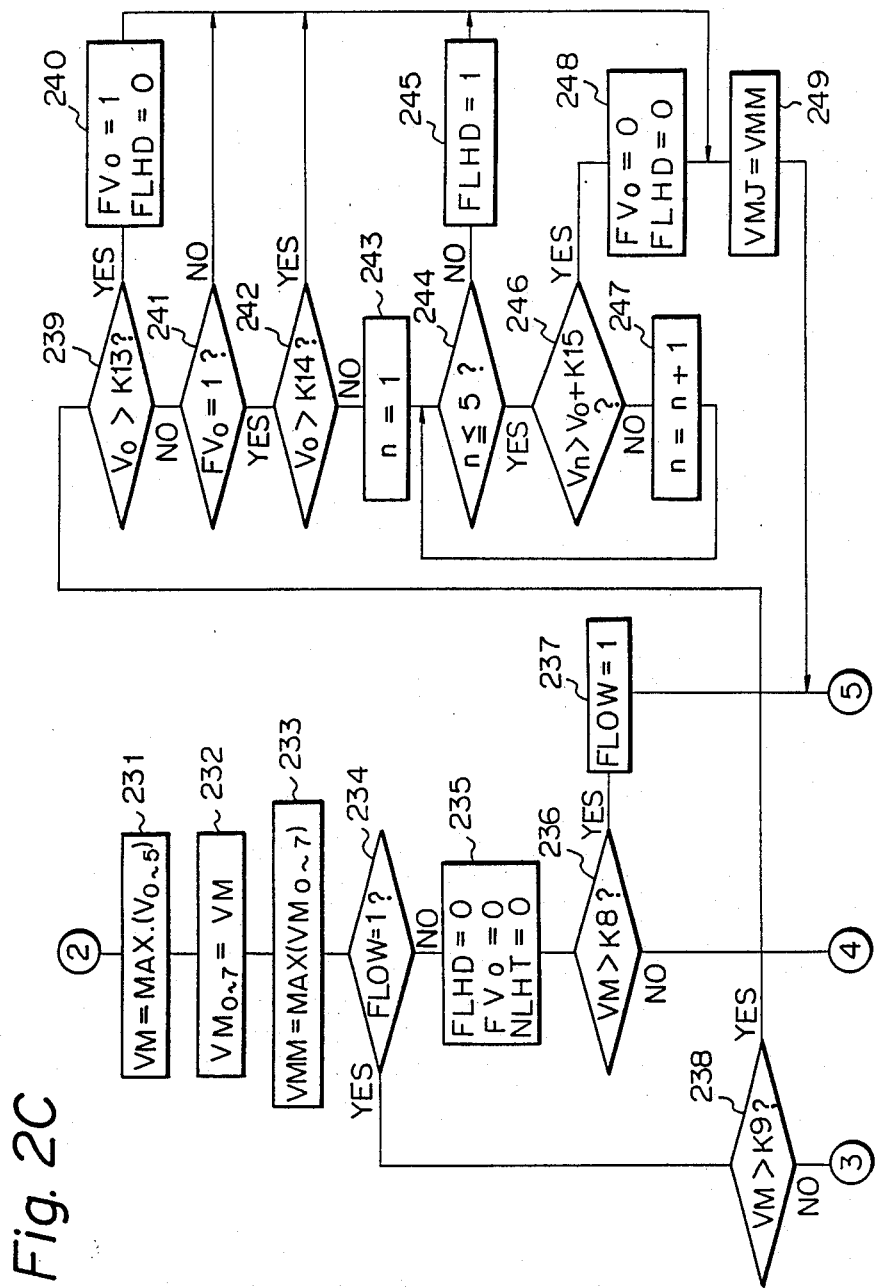

FIG. 1 shows the fundamental arrangement of the apparatus for controlling the headlight of a vehicle according to the present invention. In FIG. 1, reference numeral 1 denotes a light detecting unit, which comprises a lens 11 for focussing the light from the headlight of an oncoming vehicle or from the taillight of a preceding vehicle, and a photo sensor 12 consisting of a plurality of photoelectric elements, for example, silicon photo diodes, arranged in a plane perpendicular to the central axis of the lens 11 for generating a light detection signal corresponding to the quantity of light received by each of the photoelectric elements. The photo sensor 12 is placed at a distance of focus from the lens 11 such that the center of the photo sensor 12 coincides with the central axis of the lens 11. The directional angle range of the photo sensor 12 is defined by a radius of curvature of the lens 11, a focus thereof, and the number and dimensions of the photoelectric elements.

Reference numeral 2 denotes a control unit, which comprises an analog multiplexer 21, an amplifier 22, an analog to digital (A/D) converter 23, and a control circuit 24. The analog multiplexer 21 includes an analog switch and selects one of the light detection signals from the photoelectric elements by switching the analog switch according to the control signal from the control circuit 24 described later. The amplifier 22 amplifies the output signal from the multiplexer 21 with a predetermined amplification factor. The A/D converter 23 converts the voltage signal output from the amplifier 22 into digital data of 8 bits. The control circuit 24 comprises a microcomputer for executing the processing of a digital operation according to a software process based on a predetermined program. The microcomputer includes a CPU, ROM, RAM, I/O circuit, and clock generator. When the headlight is switched ON, the microcomputer is supplied with a stabilized voltage of 5 volts from loaded batteries (not shown) via a stabilized power source (not shown), is brought to the operational state, and then executes the operation process shown in FIG. 2, FIG. 6 or FIG. 9.

Reference numeral 3 denotes an illumination switching unit, which comprises a relay driving circuit 31, for example, consisting of a transistor, which in response to the output signal OUT from the control circuit 24, drives a relay 32 consisting of a solenoid and a contact, to switch the illumination mode of a headlight 4. The headlight 4 comprises a filament for a high beam mode 41 and a filament for a low beam mode 42. When the above output signal OUT is at a high level, the relay driving circuit 31 and the relay 32 are turned ON and the low beam mode filament 42 in the headlight 4 is activated. On the other hand, when the output signal OUT is at a low level, the relay driving circuit 31 and the relay 32 are turned OFF and the high beam mode filament 41 is activated.

First Embodiment

The arrangement and operation of a first embodiment of the present invention will now be described with reference to FIGS. 2, 3, 4, and 5.

FIGS. 2A, 2B, 2C, 2D, 2E and 2F, show a control program for the microcomputer in the control circuit 24 according to the first embodiment of the present invention. The operation of the control circuit 24 based on this control program will be described later in detail.

Figure 4:
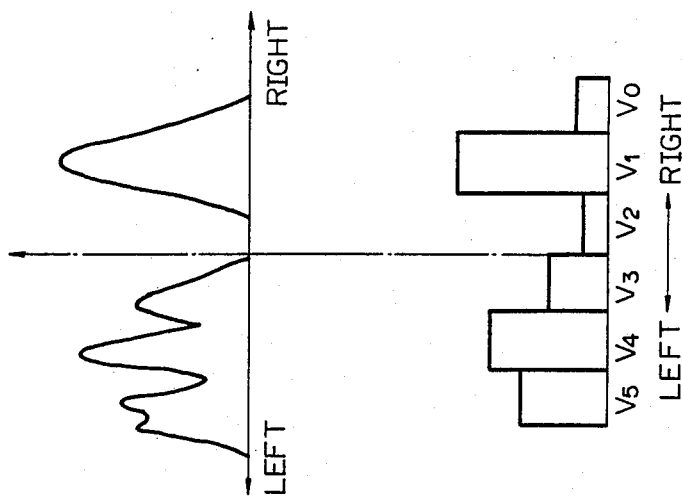
FIG. 4 shows another example of the light reception characteristic of the photo sensor of light from a vehicle in the embodiment of FIGS. 2A-2F.
Figure 3:
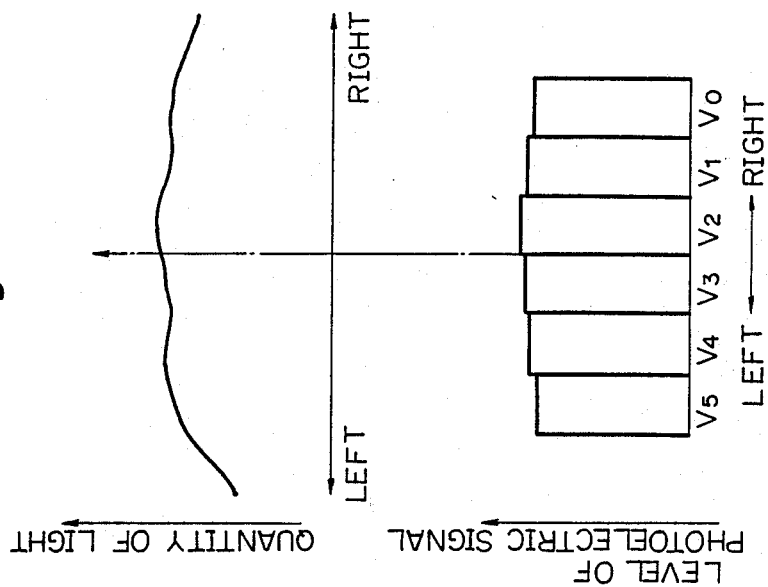
FIG. 3 shows an example of the light reception characteristic of the photo sensor of reflected light in the embodiment of FIGS. 2A-2F.

The light reception characteristics of the photo sensor 50, denoted by reference numeral 12 in FIG. 1, in the first embodiment are shown in FIGS. 3 and 4. FIG. 3 shows the characteristic of the light reflected from the road, guardrails, and the like. The upper part of FIG. 3 shows the distribution of the quantity of the light incident on the photo sensor, and the lower part of FIG. 3 shows the output levels of the respective photoelectric elements. FIG. 4 shows the characteristic of the light from a preceding or oncoming vehicle. The upper and lower parts of FIG. 4 correspond to those of FIG. 3.

Figure 5:
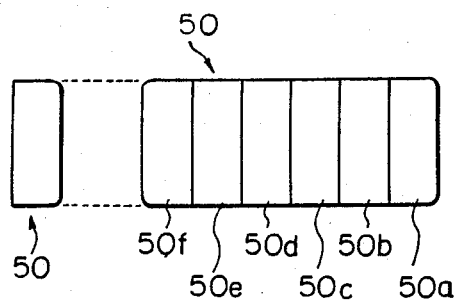
FIG. 5 shows an example of the arrangement of photoelectric elements of the photo sensor in the embodiment of FIGS. 2A-2F.

An example of the arrangement of the photoelectric elements of the photo sensor 50 is schematically shown in FIG. 5. The left part of FIG. 5 shows a side view of the photo sensor 50, and the right part shows a front view thereof. The photo sensor 50 consists of six photoelectric elements 50a, 50b, 50c, 50d, 50e, and 50f arranged in the horizontal direction from right to left when facing the front of the vehicle. The upper and lower directional angle range of the photo sensor 50 is set at 2°. The left and right directional angle range per one element is set at 1.3°, and accordingly, the left and right directional angle range of all of the elements is set at 7.8°. This setting of the upper and lower directional angle range is only for the reception of light from an oncoming or preceding vehicle, not for the reception of light from a street light and the like. Also, the setting of the left and right directional angle range per one element is for enabling distinction between the light from the preceding or oncoming vehicle and the light reflected from the road, guardrails, and the like, and the setting of the left and right directional angle range of all of the elements is only for the reception of light from the oncoming or preceding vehicle.

In the first embodiment, a distance detecting circuit 5, shown by a broken line in FIG. 1, is connected to the control circuit 24. The distance detecting circuit 5 comprises a revolution detecting sensor for generating a distance signal of 30 pulses per one revolution of the speed meter cable, and a counter for counting the pulses generated and generating the distance data S(5) based on that count.

In the vehicle provided with the apparatus constituted as shown in FIG. 1, when the headlight is switched ON at the beginning of operation, the electric system is supplied with power from the loaded batteries and is brought to the operating state. The microcomputer in the control circuit 24 is supplied with a stabilized voltage of 5 volts from the loaded batteries via a stabilized power circuit, is brought to the operating state, and executes the operation of the control program shown in FIGS. 2A to 2F.

The operation of the control circuit 24 according to the first embodiment will be described hereinafter with reference to FIGS. 2A to 2F.

First, referring to FIG. 2A, at step 201 the initialization of a register, timer, memory and the like in the microcomputer is carried out, and the control advances to step 202. A judgement of whether or not 125 milliseconds have elapsed is made by the timer at step 202, if the result is NO, the control repeatedly executes step 202. When 125 milliseconds have elapsed, the result becomes YES and the control advances to step 203. At step 203, the timer is reset, and at step 204 the distance data S(5) is read from the distance detecting circuit 5. At step 205, the distance counter in the distance detecting circuit 5 is reset. Accordingly, the distance data S(5) read at step 204 indicates a running distance per 125 milliseconds. At steps 206, 207, and 208, a variable m is set which is incremented by 1 at every 125 milliseconds, from 0 to 7.

Next, at steps 209 to 215, the quantity of light received at each of the photoelectric elements 50a to 50f, respectively, is read 8 times, averaged, and becomes $V_0$, $V_1$, $V_2$, $V_3$, $V_4$, and $V_5$, respectively. $V_0$ to $V_5$ correspond to the arrangement of the photoelectric elements from the right to the left when facing the front of the vehicle, as shown in FIGS. 3 and 4.

Steps 209 to 215 are described hereinafter in detail. At step 209, n, which indicates the order of the photoelectric elements, is set to 0, and the control advances to step 210. At step 210, it is judged whether or not n is equal to or less than 5. If the result is YES, the control advances to step 211. If the result is NO, the control advances to step 216, as the process for inputting and averaging of the outputs of all of the 6 photoelectric elements is finished. At step 211, a signal for selecting the output of the channel n photoelectric element is transmitted to the multiplexer 21. At step 212, the output $V_n'$ of the channel n photoelectric element is input to the A/D converter 23. At step 213, $V_n'$ is stored in the variable row $V_{nm}$ for averaging, and at step 214, $V_{nm}$, i.e., $V_{n0}$ to $V_{n7}$ are averaged and brought to $V_n$. At step 215, 1 is added to n, and the control then returns to step 210 to prepare the process for inputting and averaging the output of the next photoelectric element.

After the process of steps 209 to 215 is completed, the minimum value VMIN and maximum value VMAX of $V_0$ to $V_5$ are calculated at step 216.

Next, referring to FIG. 2B, a judgement of whether or not VMIN is more than K1, which is 3.5 volts in the present example, is made at step 217. If the result is YES, the control skips the process for the judgement of reflection mentioned later, i.e., steps 218 to 230, and advances to step 231. This process prevents a misjudgement of a reflection when all of the photoelectric elements receive a very intense light.

At step 218, it is judged whether or not FLOW is equal to 1, which indicates the low beam state, and VMIN is more than K2 (0.5 volts). If the result is YES, the control advances to step 231. Also at step 218, when a predetermined quantity or more of light is received, a judgement is made that the light is not due to a reflection, since any reflection in the low beam state would be very weak.

At steps 219 to 223, the allowable level KA for the judgement of reflection is calculated. The judgement of whether or not FLOW is equal to 0, which indicates the high beam state, and whether VMIN is less than K3 (2.0 volts) is made at step 219. If the result is YES, the control advances to step 220 and the operation of KA=V-MIN * K4 (0.6) and KB=K5 (0.5 volts) is executed. If the result at step 219 is NO, the control advances to step 221 and the operation of KA=VMIN * K6 (0.3) and KB=K7 (0.15 volts) is executed. At steps 222 and 223, the minimum value of KA is stored in KB. This process is for making an exact judgement of the reflection, as refection often occurs and the level of reflection is quickly dispersed when VMIN is less than K3 in the high beam state.

Next, at steps 224 to 228, if the difference between the respective output $V_n$ of the photoelectric elements and VMIN is less than the aforementioned allowable level KA, the bit n of a variable VCNT corresponding to the respective photoelectric element is set to 1, and the control advances to step 229. At steps 229 and 230, if the variable VCNT is equal to "111111B", that is, the difference between the respective output of the photoelectric elements and VMIN is less than the allowable level KA in regard to all of the photoelectric elements, the judgement of reflection is made and $V_0$ to $V_5$ are set to 0.

The process for the judgement of reflection at steps 218 to 230 adopts the following principle; the light reception characteristic of light from the vehicle's own headlight reflected by a sloping road, the road in front of the vehicle, guardrails, and the like is almost uniform as shown in FIG. 3. However light reception characteristic of the light from the headlight or taillight of another vehicle is not uniform, as shown in FIG. 4, even if this light consists of a mixture of lights from a plurality of vehicles.

Next, as shown in FIG. 2C, the control advances to step 231, where the maximum value VM of $V_0$ to $V_5$ is calculated. At steps 232 and 233, the maximum value of $VM_0$ to $VM_7$ is stored in VMM.

At step 234, a judgement is made of whether or not FLOW is equal to 1, which indicates the low beam state. If the result is YES, which indicates the low beam state, the control executes steps 238 to 260, and if the result is NO, which indicates the high beam state, the control executes steps 235 to 237.

The process for the high beam state is now described. At step 235, the variables FLHD, $FV_0$, and NLHT used in the low beam state are set to 0, and the control advances to step 236. At step 236, a judgement of whether or not VM is more than K8 (0.5 volts) is made. If the result is YES, the control advances to step 237, executes the operation of FLOW=1 and then advances to step 261. If the result is NO at step 236, the control advances to step 262.

The process for the low beam state is now described hereinafter. The judgement of whether or not VM is more than K9 (0.15 volts) is made at step 238. If the result is YES, the control executes steps 239 to 249, and if the result is NO, the control executes steps 250 to 260.

First, steps 239 to 249 are explained with reference to FIG. 2C. This process is executed when the headlight is in the low beam state and a large quantity of light is received. The control sets the variables $FV_0$, FLHD and VMJ used at steps 250 to 260. At step 239, a judgement of whether or not $V_0$ corresponding to the quantity of light received at the rightmost element is more than K13 (3.5 volts) is made. If the result is YES, the control advances to step 240, executes the operation of $FV_0$=1 and FLHD=0, and then advances to step 249. If the result is NO at step 239, the control advances to step 241. The judgement of whether or not $FV_0 = 1$ is made at step 241, and if the result is YES, the control advances to step 242. If the result is NO, the control jumps to step 249. The judgement of whether or not $V_0$ is more than K14 (1.7 volts) is made at step 242. If the result is YES, the control jumps to step 249, and if the result is NO, the control advances to step 243.

The judgement of whether or not any one of $V_1$ to $V_5$ is more than $V_0 + K15$ (0.1 volts) is made at steps 243 to 247. If the result is YES, the control advances to step 248, executes the operation of $FV_0 = 0$ and $FLHD = 0$, and advances to step 249. If the result is NO at steps 243 to 247, the control executes the operation of $FLHD = 1$ at step 245 and advances to step 249. That is, in the process of steps 239 to 249, the control sets FLHD at 1 where $V_1$ to $V_5$ is less than $V_0$ when $V_0$ is equal to or less than K14 after $V_0$ once exceeds K13. A concrete case of $FLHD = 1$ is that where $V_0$ is increased due to the approach of an oncoming vehicle, decreased due to the passing-by of that vehicle, and the light from other vehicles is not detected Next, at step 249, VMM is stored in VMJ. VMM is the maximum value of $VM_0$ to $VM_7$, i.e., the maximum value of VM for one second. Accordingly, VMJ indicates the maximum value of VM for 125 milliseconds just before the state $VM > K9$ changes to the state $VM \leq K9$ in the low beam state. The control then advances to step 261.

Figure 2D:
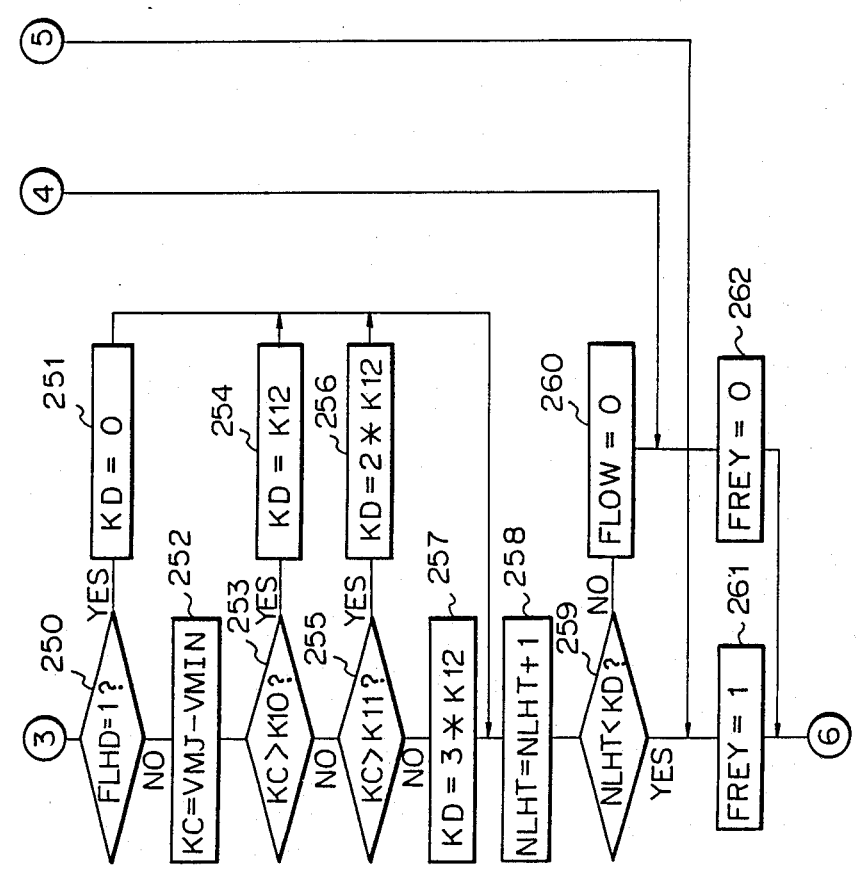
Figure 2F:
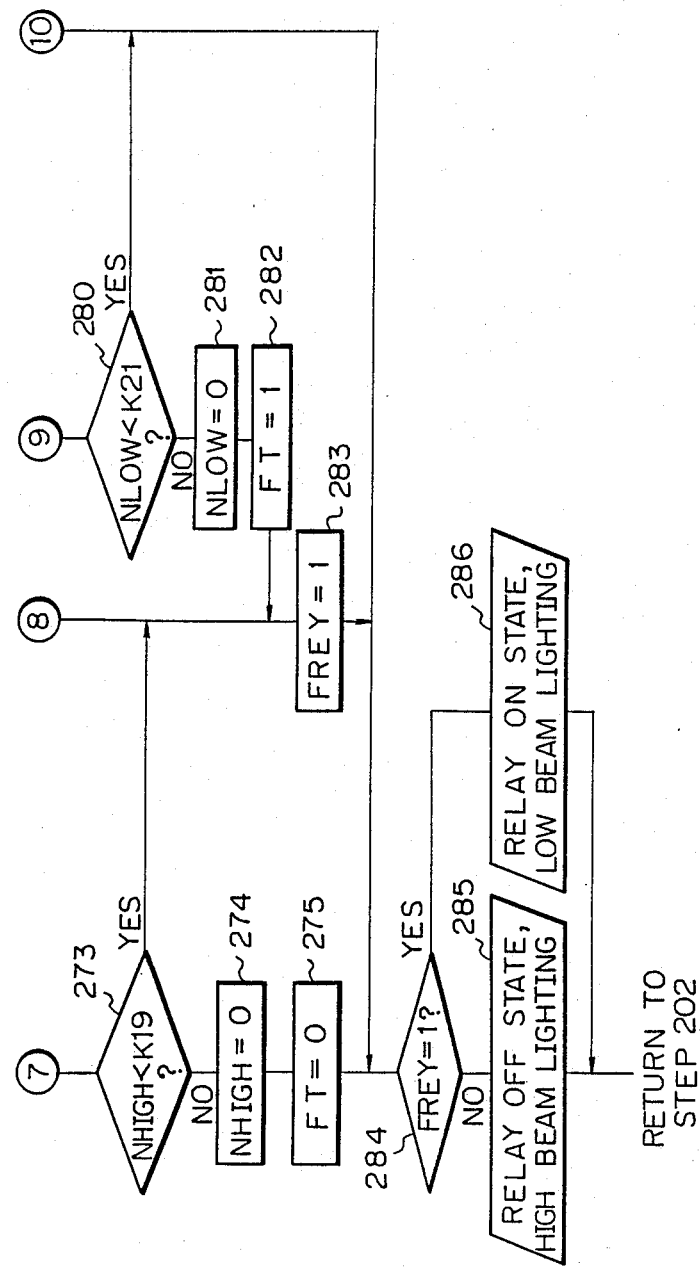

Next, steps 250 to 260 are explained with reference to FIG. 2D. At steps 250 to 260, the control executes the process for the time delay for a change from the low beam state to the high beam state. The judgement of whether or not FLHD is equal to 1 is made at step 250. If the result is YES, the control executes the operation of a time constant $KD = 0$ at step 251 and skips to step 258. If the result is NO at step 250, the control advances to step 252 and executes the operation of $KC = VMJ - VMIN$. At steps 253 to 257, the control executes the following operations: $KD = K12$ (2.5 seconds) when $KC > K10$ (2.5 volts); $KD = 2 * K12$ (5.0 seconds) when $KC > K11$ (1.0 volt); and $KD = 3 * K12$ (7.5 seconds) when $KC \leq K11$. The control then advances to step 258. At step 258, 1 is added to NLHT to integrate the time when the headlight is in the low beam state and $VM \leq K9$. The judgement of whether or not NLHT is less than KD is made at step 259, and if the result is YES, the control advances to step 261. If the result is NO at step 259, the control advances to step 260, executes the operation of $FLOW = 0$, and then advances to step 262. That is, the process at steps 250 to 260 is executed immediately when an oncoming vehicle passes by and, in other cases, is executed with a longer time delay when the maximum value of the latest prior data of the quantity of light received is smaller.

At steps 261 and 262, the control sets FREY to 1 or 0, for instructing the illumination mode to be in the low beam mode.

At steps 263 to 283, the control executes the process for forcibly changing to the low beam state according to the running speed. Steps 263 to 267 show the process for the judgement in the high speed area. Once S(5) corresponding to the speed is equal to or more than K16 (90 km/h), the control advances to step 283, executes the operation of $FREY = 1$, forcibly changes to the low beam state, and maintains the state until S(5) is equal to or less than K17 (80 km/h). Steps 268 to 282 indicate the process for the judgement in the low speed area. Once S(5) is equal to or less than K20 (30 km/h) and NLOW is equal to or more than K21 (0.25 seconds), the control advances to step 283, executes the operation of $FREY = 1$, forcibly changes to the low beam state, and maintains the state until S(5) is more than K18 (40 km/h) and NHIGH is equal to or more than K19 (0.25 seconds). The process at steps 263 to 283 is used to prevent the headlight from being switched to the high beam state when the headlight of an oncoming vehicle is switched off during a halt at a crossing, or when the light reflected by the headlight of the self vehicle from a preceding vehicle is detected.

At steps 284 to 286, the control executes an ON/OFF of the relay for switching to the high beam mode or low beam mode according to the set FREY. The control then returns to step 202.

Additionally, six photoelectric elements are used in the aforementioned first embodiment, but this number can be changed according to the increase or decrease of the directional angle range in the right and left directions. Also, it is possible to increase the directional angle range per one element and to decrease the number of the elements, or to decrease the directional angle range per one element and to employ many elements, e.g., a one-dimensional image sensor, so long as the distinction between the reflected light and the light beams from a variety of vehicles is possible. Furthermore, a television camera can be used.

The judgement of reflection need not be a judgement of whether or not the outputs of all of the elements are within the predetermined level, but may be a judgement based on the outputs of successive limited elements. Furthermore, the difference between the outputs of the adjacent elements can be utilized in the judgement based on the predetermined level. Moreover, it s possible to base the judgement of reflection on not only the predetermined level but also the successive change of levels, for example, a right-slant change, left-slant change, peak-shaped change, and the like.

Second Embodiment

The arrangement and operation of a second embodiment of the present invention will now be described with reference to FIGS. 6, 7, and 8.

Figure 6A:
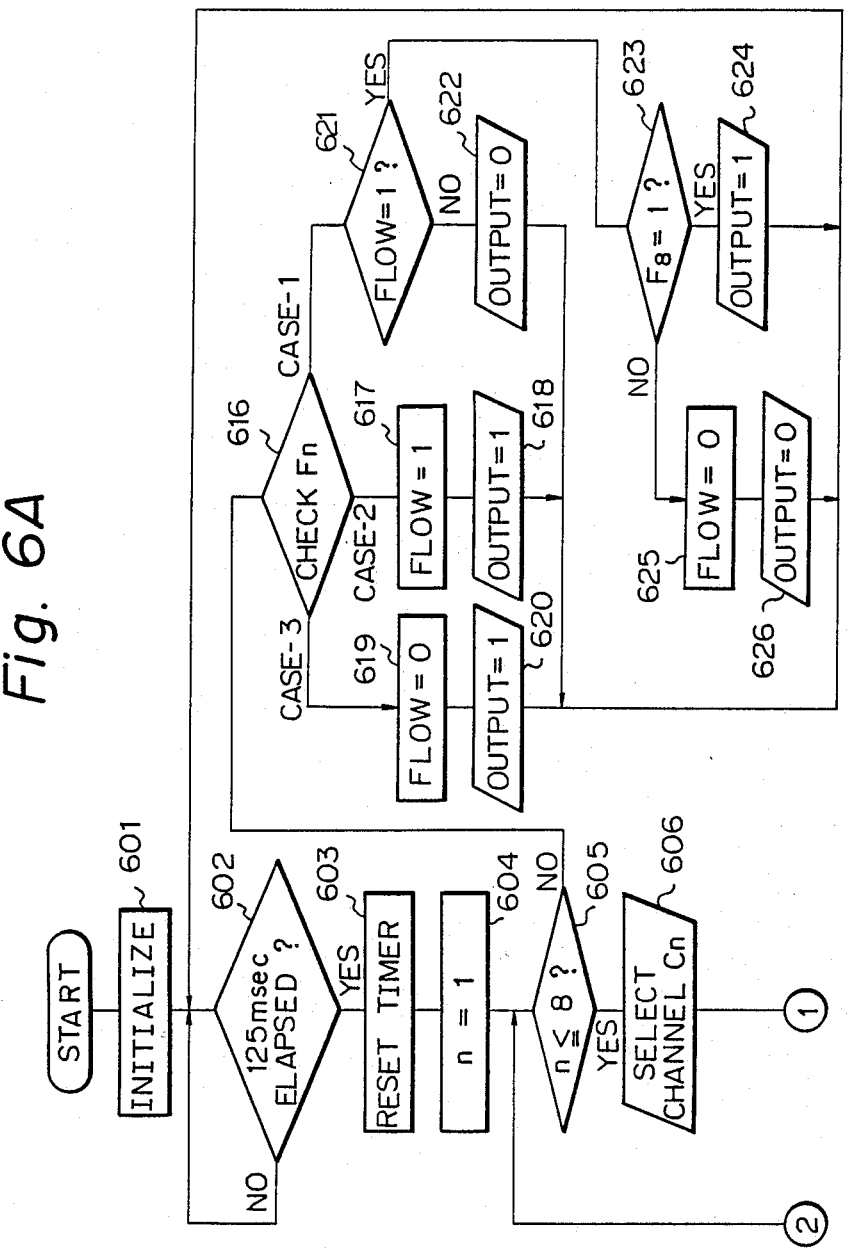
FIGS. 6A and 6B are a flow chart of the operation of the control circuit according to another embodiment of the present invention.
Figure 6B:
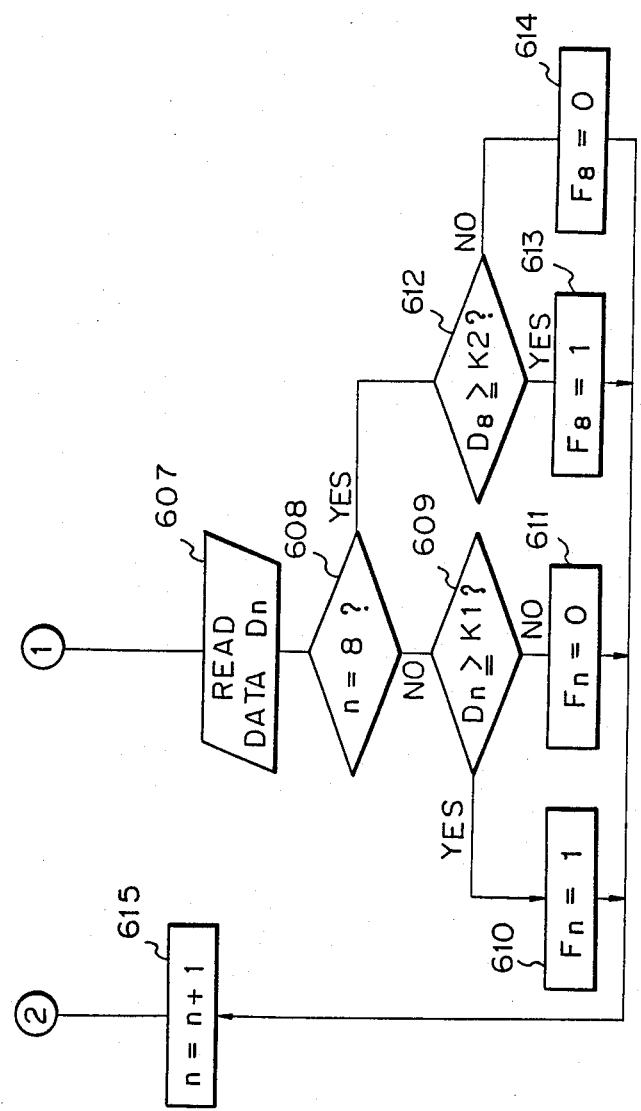

FIGS. 6A and 6B, shown a control program of the microcomputer in the control circuit 24 according to the second embodiment. The operation of the control circuit 24 based on the control program will be described later in detail.

Figure 7:
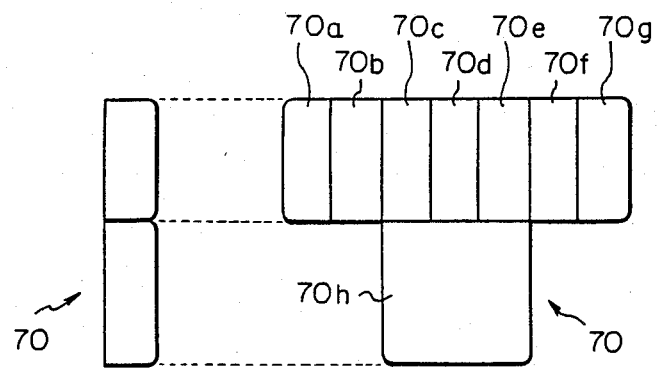
FIG. 7 shows an example of the arrangement of photo electric elements of the photo sensor in the embodiment of FIGS. 6A and 6B.
Figure 8:
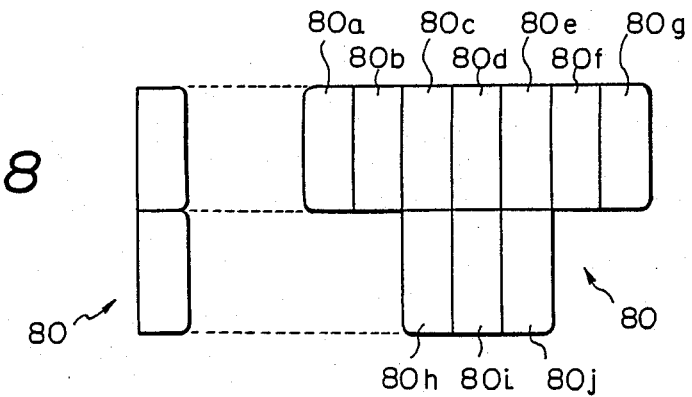
FIG. 8 shows another example of the arrangement of photo electric element of the photo sensor in the embodiment of FIGS. 6A and 6B.

An example of the arrangement of the photoelectric elements of the photo sensor 12 of FIG. 1 is schematically shown by reference numeral 70 in FIG. 7. The left part of FIG. 7 shows a side view of the photo sensor 70, and the right part shows a front view thereof. The photo sensor 70 consists of seven photoelectric elements 70a, 70b, 70c, 70d, 70e, 70f, and 70g arranged in the horizontal direction from left to right when facing the front of the vehicle, and a photoelectric element 70h specially arranged at the lower side of three elements 70c, 70d, and 70e and having an area 4.5 times that of the other elements.

The upper and lower directional angle range and the left and right directional angle range per one element of the elements 70a to 70g are set at 2° and 1.3°, respectively. Also, the upper and lower directional angle range and the left and right directional angle range of the element 70h are set at 3° and 3.9°, respectively. Accordingly, in sum, the left and right directional angle range is about 9°, the upper directional angle range and the lower directional angle range in the central portion are about 4° and 1°, respectively, and the upper and lower directional angle range at both ends is 2°. The upper and lower directional angle range is set for the reception of light from an oncoming or preceding vehicle, not for the reception of light from street lights and the like. The left and right directional angle range per one element is set for a distinction between light from the preceding or oncoming vehicle and light reflected from the road, guardrails and the like, and the left and right directional angle range of all of the elements is set for the reception of light from the preceding or oncoming vehicle.

The operation of the control circuit 24 according to the second embodiment will be described hereinafter with reference to FIGS. 6A and 6B.

First, at step 601 the initialization of a register, timer, counter, latch and the like in the microcomputer is carried out, and the control then advances to step 602. At step 602, a judgement of whether or not 125 milliseconds have elapsed is made by the timer. If the result is NO, the control repeatedly executes step 602. When 125 milliseconds have elapsed, the judgement becomes YES and the control advances to step 603. At step 603 the timer is reset, and the control advances to step 604. At step 604, the control sets a variable n, corresponding to the number of photoelectric elements of the photosensor 70, to 1.

At step 605, a judgement of whether or not the variable n is equal to or less than 8 is made. If the result is YES, the control advances to step 606, and if the result is NO, the control advances to step 616. At step 606, the control signal $C_n$ is transmitted to the analog multiplexer 21. At step 607, the digital data $D_n$ is read from the A/D converter 23. At step 608, a judgement of whether or not the variable n is equal to 8 is made. If the result is YES, that is, where the output of the photoelectric element 70h among the elements of the photo sensor 70 is read out, the control advances to step 612. If the result is NO at step 608, that is, where the output of any of the elements 70a to 70g is read out, the control advances to step 609.

A judgement of whether or not the data $D_n$ is equal to or more than the constant K1 is made at step 609. If the result is YES, that is, where the photoelectric element of channel n of the photo sensor 70 receives a predetermined quantity or more of light, the control advances to step 610, sets the flag $F_n$ indicated by the variable n to 1, and advances to step 615. If the result is NO at step 609, that is, where the photoelectric element of channel n of the photo sensor 70 does not receive a predetermined quantity or more of light, the control advances to step 611, sets the flag $F_n$ to 0, and advances to step 615.

A judgement of whether or not the output data $D_8$ of the photoelectric element 70h is equal to or more than the constant K2 is made at step 612. The constant K2 is set to be greater than the aforementioned constant K1 taking into consideration the ratio of the area of the element 70h to that of the other element and the light reception distance. In the present example, $K2 = 6 \times K1$. If the result is YES at step 612, that is, where the photoelectric element 70h receives a predetermined quantity or more of light, the control advances to step 613, sets the flag $F_8$ to 1, and advances to step 615. If the result is NO at step 612, the control advances to step 614, sets the flag $F_8$ to 0, and advances to step 615. At step 615, 1 is added to the variable n, and the control returns to step 605. The above operation process is repeated until the variable n amounts to 9.

Where n=9 at step 605, i.e., once every 125 milliseconds, the control advances to step 616 and checks the state of the flag $F_n$ (n = 1 to 8) indicated by the variable n.

At step 616, where CASE-1, the control advances to step 621. CASE-1 indicates that all of the flags $F_n$ are 0, or three or more successive flags $F_n$, for example, $F_2$, $F_3$, and $F_4$, are 1; that is, where the photo sensor 70 does not receive a predetermined quantity or more of light, or the photo sensor 70 receives a predetermined quantity or more of light over a wide area. For example, CASE-1 is caused by reflection of the headlight beams of the self vehicle from guardrails and the like.

At step 616, where CASE-2, the control advances to step 617. CASE-2 indicates that one or more of the flags $F_n$ is 1, except where three or more successive flags $F_n$ are 1, and one or more of the flags $F_3$ to $F_5$ is 1; that is, where the photo sensor 70 receives a predetermined quantity or more of light in the central portion of a plurality of photoelectric elements. For example, CASE-2 is caused by the presence of an oncoming vehicle or preceding vehicle in front of the self vehicle.

At step 616, where CASE-3, the control advances to step 619. CASE-3 indicates that one or more of the flags $F_1$, $F_2$, $F_6$, and $F_7$ is 1, that is, where the photo sensor 70 receives a predetermined quantity or more of light in the end portions of a plurality of photoelectric elements. For example, CASE-3 is caused by the passing-by of an oncoming vehicle, or by the preceding vehicle which is off to one side.

At step 617, the control sets the flag FLOW to 1, which indicates the detection of light in the central portion of the photo sensor 70. Then, at step 618, the control outputs a signal "1", i.e., high level, as the OUT signal to switch the illumination mode of the headlight 4 to the low beam 42, and the control returns to step 602. At step 619, the control sets the flag FLOW to 0. Then, at step 620, the control outputs a signal "1" as the OUT signal, and the control returns to step 602.

A judgement of whether or not the flag FLOW is equal to 1 is made at step 621. If the result is NO, that is, where the photo sensor 70 does not detect light in the central portion thereof, the control outputs a signal "0", i.e., low level, as the OUT signal to switch the illumination mode of the headlight 4 to the high beam 41, and the control returns to step 602.

If the result is YES at step 621, that is, where first the photo sensor 70 detects light in the central portion thereof, and then does not detect the light, the control advances to step 623. For example, this is caused by the approach of the self vehicle to a preceding vehicle such as a truck or bus, and the like having the taillight at a high position.

A judgement of whether or not the flag $F_8$ is equal to 1 is made at step 623. If the result is YES, that is, where the presence of the preceding vehicle having the taillight at a high position, at step 624, the control outputs a signal "1" as the OUT signal, and the control returns to step 602. If the result is NO at step 623, that is, in the absence of a preceding vehicle, at step 625, the control sets the flag FLOW to 0, and the control advances to step 626. At step 626, the control outputs a signal "0" as the OUT signal, and the control returns to step 602.

As described above, the judgement for switching the illumination mode of the headlight 4 is repeated every 125 milliseconds, based on the photoelectric signal from the photo sensor 70.

In addition, eight photoelectric elements of the photo sensor 70 are used in the aforementioned second embodiment, but this number can be changed according to the increase or decrease of the directional angle range in the right and left directions. Also, it is possible to change the dimension per one element so long as a distinction between the reflected light and the light beams from a variety of vehicles is possible, and the predetermined directional angle range in the upper and lower direction is ensured.

Furthermore, the data $D_n$ of the photoelectric elements 70a to 70g and the data $D_8$ of the specially arranged photoelectric element 70h are compared with the different reference levels, i.e., K1 and K2. As another process, however, it is possible to compare the data $D_n$ and $D_8$ with the same reference level, i.e., K1, by dividing the data $D_8$ corresponding to the element 70h by the value of K2, that is, by decreasing the gain of the element 70h.

Still further, only the specially arranged photoelectric element 70h is bigger than the other elements 70a to 70g in the aforementioned second embodiment, but the form of the specially arranged photoelectric element is not restricted to the above. A modified example of the photo sensor shown in FIG. 7 is schematically shown in FIG. 8. The left part of FIG. 8 is a side view of the photo sensor 80, and the right part shows a front view thereof. Three photoelectric elements 80h, 80i, and 80j are employed in place of the element 70h of FIG. 7 as the specially arranged photoelectric element for the upper directional angle range, and these elements are the same size as the other elements 80a to 80g.

Third Embodiment

The arrangement and operation of a third embodiment of the present invention will now be described with reference to FIGS. 9, 10, 11, and 12.

Figure 9A:
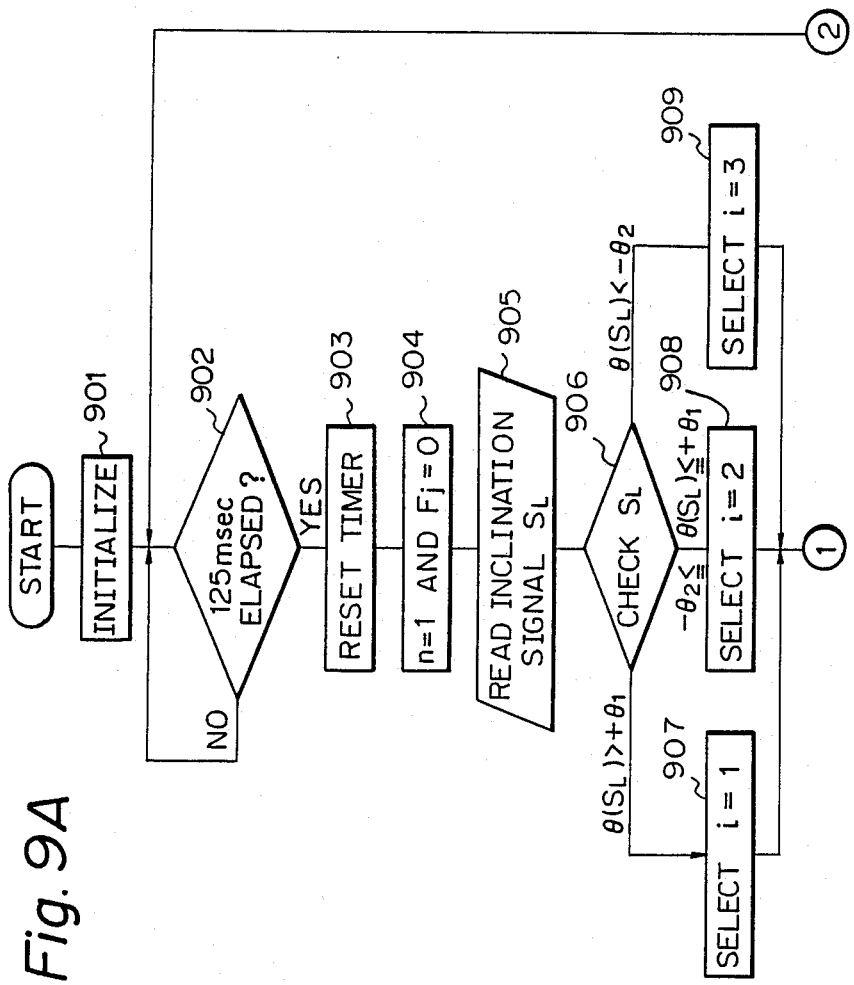
FIGS. 9A and 9B is a flow chart of the operation of the control circuit according to still another embodiment of the present invention.
Figure 9B:
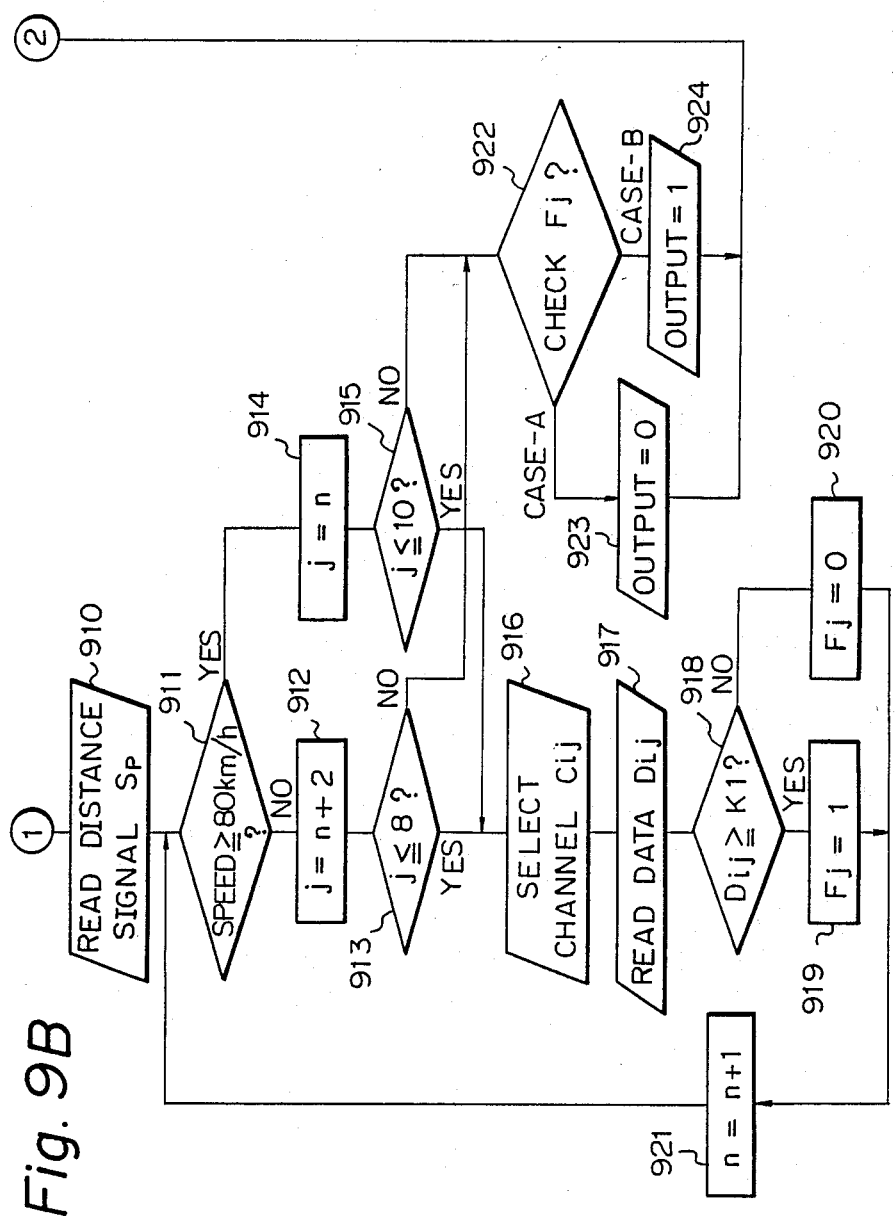

FIGS. 9A and 9B show a control program of the microcomputer in the control circuit 24 according to the third embodiment is shown. The operation of the control circuit 24 based on the control program will be described later in detail.

The upper and lower change and the left and right change of the directional angle range of the photo sensor 120, denoted by reference numeral 12 in FIG. 1, in the third embodiment are shown in FIGS. 10 and 11, respectively. In FIGS. 10 and 11, the vehicle shown in the right side is the self vehicle provided with the photo sensor 120, and the hatched portions therein show the light reception area of the sensor. In FIG. 10, (1) shows the case that the inclination angle is within the predetermined angles ($\pm 1°$), that is, i=2 is selected based on a result of the judgement at step 906, (2) shows the case where the inclination angle is above the predetermined angle (1°) and i=1 is selected, and (3) shows the case where the inclination angle is below the predetermined angle ($-1°$) and i=3 is selected. On the other hand, in FIG. 11, (1) shows the case where the speed is below the predetermined speed (80 km/h), that is, j=3 to 8 is selected based on a result of the judgement at step 911, and (2) shows the case where the speed is above 80 km/h and j=1 to 10 is selected.

Figure 12:
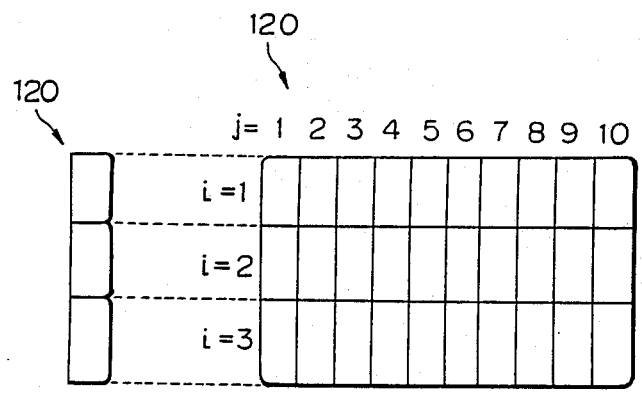

An example of the arrangement of the photoelectric elements of the photo sensor is schematically shown by reference numeral 120 in FIG. 12. The left part of FIG. 12 shows a side view of the photo sensor 120, and the right part shows a front view thereof. The photo sensor 120 consists of thirty photoelectric elements arranged in arrays (i=3, j=10). The upper and lower directional angle range and the left and right directional angle range per one element are set to 2° and 1.3°, respectively. Accordingly, as a whole, the upper and lower directional angle range and the left and right directional angle range are 6° and 13°, respectively.

In the third embodiment, a speed sensor 6 and an inclination sensor 7, shown by a broken line in FIG. 1, are connected to the control circuit 24. The speed sensor 6 generates a distance signal S(6) of 60 pulses per one revolution of the speed meter cable. This kind of speed sensor is disclosed, for example, in Japanese Unexamined Patent Publication (Kokai) No. 5587955. The inclination sensor 7 generates an inclination signal S(7) proportional to the inclination of the vehicle. This kind of inclination sensor is disclosed, for example, in Japanese Unexamined Patent Publication (Kokai) No. 59-42409.

The operation of the control circuit 24 according to the third embodiment will be described hereinafter with reference to FIGS. 9A and 9B.

First, at step 901 the initialization of a register, timer, counter, latch and the like in the microcomputer is carried out, and the control advances to step 902. At step 902, a judgement whether or not 125 milliseconds have elapsed is made by the timer. If the result is NO, the control repeatedly executes step 902. Where 125 milliseconds have elapsed, the result becomes YES and the control advances to step 903. At step 903, the timer is reset, and the control advances to step 904.

At step 904, the control sets a variable n to 1 and all of the flags $F_j$, in the present example j=1 to 10, corresponding to the photoelectric elements in the left and right direction to 0. At step 905, the inclination signal S(7) is read out from the inclination sensor 7. At step 906, the inclination angle $\theta$ of the vehicle is calculated based on the inclination signal S(7) and compared with the predetermined angles $\theta_1$ in the present example $\theta_1 = 1°$, and $-\theta_2$, in the present example $\theta_2 = 1°$. Where $\theta > \theta_1$ at step 906, that is, where the vehicle is running on an upward slope or is accelerating, the control advances to step 907 and selects the row corresponding to i=1 of the photoelectric element array, to turn the directional angle range of the photo sensor 120 downward. Where $\theta < -\theta_2$ at step 906, that is, where the vehicle is running on a downward slope or is decelerating, the control advances to step 909 and selects the row corresponding to i=3 of the photoelectric element array, to turn the directional angle range of the photo sensor 120 upward. Where $-\theta_2 \leq \theta \leq \theta_1$ at step 906, the control advances to step 908 and selects the row corresponding to i=2 of the photoelectric element array, to turn the directional angle range of the photo sensor 120 to a central position.

At step 910, the distance signal S(6) is read from the speed sensor 6. At step 911, a judgement of whether or not the speed calculated based on the distance signal S(6) is equal to or more than the predetermined speed, for example, 80 km/h, is made. If the result is YES, that is, where the vehicle is running on a multi-lane road such as a motorway, the control advances to step 914. If the result is NO at step 911, that is, where the vehicle is running on a non-multi-lane road, the control advances to step 912.

At step 912, the control executes the operation of a variable j=n+2, and the control advances to step 913. At step 913, a judgement of whether or not the variable j is equal to or less than 8 is made. If the result is YES, that is, where the photoelectric element corresponding to j=9 of the photo sensor 120 is not yet selected, the control advances to step 916. At step 914, the control executes the operation j=n, and the control advances to step 915. At step 915, a judgement of whether or not the variable j is equal to or less than 10, is made. If the result is YES, that is, where the photoelectric element corresponding to j=11 of the photo sensor 120 is not yet selected, the control advances to step 916. If the result is NO at steps 913 and 915, that is, where the process for reading the data from the predetermined plurality of photoelectric elements is finished, the control advances to step 922.

At step 916, the control signal $C_{ij}$ from the control circuit 24 is transmitted to the analog multiplexer 21. At step 917, the digital data $D_{ij}$ corresponding to the photoelectric element indicated by the control signal $C_{ij}$ is read from the A/D converter 23. At step 918, a judgement of whether or not the digital data $D_{ij}$ is equal to or more than the constant K1 is made. If the result is YES, that is, where the photoelectric element corresponding to the row of i and the column of j in the photo sensor 120 receives a predetermined quantity or more of light, the control advances to step 919, sets the flag $F_j$ indicated by the variable j to 1, and advances to step 921. If the result is NO at step 918, that is, where the photoelectric element corresponding to the row of i and the column of j in the photo sensor 120 does not receive a predetermined quantity or more of light, the control advances to step 920, sets the flag $F_j$ to 0, and advances to step 921.

At step 921, 1 is added to the variable n, and the control returns to step 911. The above processing of the operation is repeated until the variable j reaches 9 or 11. If j=9 at step 913 and j=11 at step 915, i.e., once every 125 milliseconds, the control advances to step 922 and checks the state of the flag $F_j$, where j=1 to 10, indicated by the variable j.

At step 922, where CASE-A, the control advances to step 923. CASE-A indicates that all of the flags $F_j$ are 0, or three or more successive flags $F_j$ for example, $F_3$, $F_4$, and $F_5$, are 1, that is, the photo sensor 120 does not receive a predetermined quantity or more of light, or the photo sensor 120 receives a predetermined quantity or more of light covering a wide area. For example, CASE-A is caused by a reflection of the headlight beams of the self vehicle from guardrails and the like. At step 922, where CASE-B, the control advances to step 924. CASE-B indicates that one or more of the flags $F_j$ is 1, except where three or more successive flags $F_j$ are 1, that is, the photo sensor 120 receives a predetermined quantity or more of light in one or two successive photoelectric elements.

At step 923, the control outputs the signal "0", i.e., low level, as the OUT signal to switch the illumination mode of the headlight 4 to the high beam 41, and the control returns to step 902. At step 924, the control outputs the signal "1", i.e., high level, as the OUT signal to switch the illumination mode of the headlight 4 to the low beam 42, and the control returns to step 902.

Additionally, only the digital data $D_{ij}$ corresponding to the specific photoelectric element is read, based on the outputs of the speed sensor 6 and inclination sensor 7 in the aforementioned third embodiment. As an alternative process, however, it is possible to read all of the digital data and to then control the switching between the low beam mode and the high beam mode of the headlight of the vehicle based on the distance signal S(6) and inclination signal S(7). Also, it is possible to cope with the loss of sight of the light source occurring in the case that the preceding or oncoming vehicle enters a sloping road, or the case where the self vehicle approaches a vehicle having a taillight at a high position such as a bus or the like, or having a taillight at a low position such as a light car or the like, by checking the flag of the photoelectric element lying in the upper or lower side of a specific photoelectric element independently of the inclination signal S(7) when the specific photoelectric element designated by the inclination signal S(7) and distance signal S(6) first detects the light and later, i.e., after 125 milliseconds, does not detect the light. Furthermore, it is possible to cope with the loss of sight of the light source occurring when the preceding or oncoming vehicle is running on a curving road, by checking the flag of the photoelectric element lying to the left or right side of a specific photoelectric element, such as the checking of element j=2 lying to the left of element j=3, or the checking of element j=9 lying to the right of element j=8, independently of the distance signal S(6) when, at a speed below 80 km/h, the specific photoelectric element corresponding to j=3 or j=8 of the photo sensor 120 first detects the light and later, i.e., after 125 milliseconds, does not detect the light.

Moreover, the number of the photoelectric elements used in the photo sensor 120 is thirty (i=3, j=10) in the aforementioned third embodiment, but the number of i or j can be changed according to the increase or decrease of the directional angle range in the upper and lower direction or in the left and right direction. Also, it is possible to change the dimension per one element so long as the distinction between the reflected light by the self headlight and the light beams from a variety of vehicles is possible, and the predetermined directional angle range in the upper and lower direction is ensured.

Still further, the case where both the speed sensor 6 and the inclination sensor 7 are simultaneously employed to change both the left and right directional angle range and the upper and lower directional angle range is described. As another form of use of the sensors, however, it is possible to employ only the speed sensor 6 to change the left and right directional angle range step by step, according to the speed, or to employ only the inclination sensor 7 to change the upper and lower directional angle range step by step, according to the inclination.

We claim:

1. A computer-controlled apparatus for controlling a headlight of a vehicle comprising:
    light detecting means for receiving a light impinging on a front end of the vehicle, including a photosensor having a plurality of photoelectric elements at least one of which is a special photoelectric element, said light detecting means for generating a plurality of light detection signals, each said light detection signal corresponding respectively to a quantity of the light received in each of said photoelectric elements, said special photoelectric element being arranged in a central portion of said photosensor and receiving an increased incident range of angles of light on the upper side thereof as compared with others of said photoelectric elements;
    control means, coupled to receive said light detection signals from said light detecting means, for:
    (1) comparing a level of at least one of said light detection signals corresponding to a quantity of light received in a predetermined photoelectric element with a predetermined level;
(2) discriminating a presence or absence of a preceding vehicle or an oncoming vehicle based on a distribution of a quantity of light received at said plurality of photoelectric elements;
(3) selecting a high beam mode or low beam mode as an illumination mode of a headlight of said vehicle based on a result of said comparing and discriminating; and
(4) generating a control signal for commanding said selected high beam mode or low beam mode; and
illumination switching means for receiving said control signal from said control means and switching the illumination mode of said headlight to obtain said selected high beam mode or low beam mode.

2. An apparatus according to claim 1, wherein said plurality of photoelectric elements are arranged such that a range of angles of light incident on the upper side of said photosensor which can be detected, is increased in a central portion of said photosensor, and the light detection signal of said special photoelectric element is used as a signal for said discriminating for switching the illumination of the headlight of said vehicle.

3. A computer-controlled apparatus for controlling a headlight of a vehicle comprising:
a speed sensor for generating a running condition signal representing a running condition of said vehicle;
light detecting means for receiving a light impinging on a front end of the vehicle using a light receiving member divided into first regions extending in the vertical direction and covering a predetermined range in the horizontal direction and second regions extending in the vertical direction and covering a range narrower than said predetermined range, and for generating a plurality of light detection signals, each corresponding to a quantity of the light received in each of said regions of said light receiving member;
means for selecting at least one of said plurality of regions based on said generated running condition signal;
means for switching a range of angles of the light incident on said light detecting means based on said selected at least one region;
control means, coupled to receive said light detection signals from said light detecting means, for:
(1) comparing a level of at least one of said light detection signals corresponding to a quantity of the light received in a predetermined region of said light receiving member with a predetermined level;
(2) discriminating a presence or absence of a preceding vehicle or an oncoming vehicle based on a distribution of a quantity of light received at said plurality of regions;
(3) selecting a high beam mode or a low beam mode as an illumination mode of the headlight of said vehicle based on results of said comparing and discriminating; and
(4) generating a control signal for commanding said selected high beam mode or low beam mode; and
illumination switching means for receiving said control signal from said control means and switching the illumination mode of said headlight to obtain said selected high beam mode or low beam mode;
wherein said first or second regions in said light receiving member being selected in accordance with the signal output from said speed sensor, whereby a range of angles of the light incident on said light detecting means is switched to the left or right direction based thereon.

4. An apparatus according to claim 3, wherein said first regions are selected so that a range of angles of the light incident on said light detecting means is increased in a horizontal direction when said running condition signal indicates that said vehicle is running at a high speed.

5. An apparatus according to claim 3, wherein said second regions are selected so that a range of angles of the light incident on said light detecting means is decreased in a horizontal direction when said running condition signal indicates that said vehicle is running at a low speed.

6. An apparatus according to claim 1, wherein a sensitivity of said at least one special photoelectric element is made lower than that of each of the remaining photoelectric elements.

7. A computer-controlled apparatus for controlling a headlight of a vehicle comprising:
an inclination sensor for detecting an inclination with regard along a running direction of said vehicle and generating an inclination signal;
light detecting means for receiving a light impinging on a front end of the vehicle using a light receiving member divided into first regions extending in the horizontal direction and covering a predetermined range in the vertical direction and second regions extending in the horizontal direction and covering another predetermined range in the vertical direction, and for generating a plurality of light detection signals, each corresponding to a quantity of the light received in each of said regions of said light receiving member;
means for selecting one of said plurality of regions based on said inclination signal;
means for switching a range of angles of the light incident on said light detecting means;
control means, coupled to receive said light detection signals from said light detecting means for:
(1) comparing a level of at least one of said light detection signals corresponding to a quantity of the light received in a predetermined region of said light receiving member with a predetermined level;
(2) discriminating a presence or absence of a preceding vehicle or an oncoming vehicle based on a distribution of quantity of light received at said plurality of regions;
(3) selecting a high beam mode or low beam mode as an illumination mode of the headlight of said vehicle based on a result of said comparing and discriminating; and
(4) generating a control signal for commanding said selected high beam mode or low beam mode; and
illumination switching means for receiving said control signal from said control means and switching the illumination mode of said headlight to obtain said selected high beam mode or low beam mode;
wherein said first or second regions in said light receiving member being selected in accordance with the signal output from said inclination sensor, whereby a range of angles of the light incident on said light detecting means is switched to the upper or lower direction based thereon.

8. An apparatus according to claim 7, wherein said first regions are selected so that a range of angles of the light incident on said light detecting means is directed to the lower direction when said inclination signal indicates that said vehicle is running on an upward slope or is accelerating.

9. An apparatus according to claim 7, wherein said second regions are selected so that a range of angles of the light incident on said light detecting means is directed to the upper direction when said inclination signal indicates that said vehicle is running on an downward slops or is decelerating.

* * * * *